United States Patent
Toyooka et al.

(10) Patent No.: US 7,722,120 B2
(45) Date of Patent: May 25, 2010

(54) AUTOMOBILE SEAT

(75) Inventors: Osamu Toyooka, Tochigi (JP);
Masanobu Kojima, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 81 days.

(21) Appl. No.: 11/722,633

(22) PCT Filed: Dec. 22, 2005

(86) PCT No.: PCT/JP2005/024173

§ 371 (c)(1),
(2), (4) Date: Mar. 17, 2008

(87) PCT Pub. No.: WO2006/075532

PCT Pub. Date: Jul. 20, 2006

(65) Prior Publication Data

US 2009/0096267 A1    Apr. 16, 2009

(30) Foreign Application Priority Data

Dec. 24, 2004    (JP)    .............................. 2004-374536

(51) Int. Cl.
*B60N 2/00*    (2006.01)
*B60N 2/02*    (2006.01)
(52) U.S. Cl. .............................. 297/354.12; 297/354.1; 297/301.3; 297/378.1
(58) Field of Classification Search ................. 297/285, 297/291, 301.1, 301.3, 354.1, 354.12, 378.1
See application file for complete search history.

(56) References Cited

U.S. PATENT DOCUMENTS

| 3,309,139 | A | * | 3/1967 | Turner et al. ............ 297/367 R |
| 4,218,092 | A | * | 8/1980 | Schach et al. ........... 297/367 R |
| 4,603,830 | A | * | 8/1986 | Franck ....................... 248/575 |
| 4,629,151 | A | * | 12/1986 | Nishino ..................... 248/396 |
| 5,979,980 | A | * | 11/1999 | Amorin et al. ........... 297/218.4 |
| 6,631,954 | B2 | * | 10/2003 | Amorin et al. ........... 297/378.1 |
| 2001/0052722 | A1 | * | 12/2001 | Amorin et al. ........... 297/378.1 |
| 2003/0227205 | A1 | * | 12/2003 | Villarroel ............... 297/354.12 |

FOREIGN PATENT DOCUMENTS

| DE | 19961655 A1 | * | 7/2001 |
| JP | 2-45383 | | 3/1990 |
| JP | 4-118053 | | 10/1992 |
| JP | 10-157500 | | 6/1998 |
| JP | 11-99029 | | 4/1999 |

* cited by examiner

*Primary Examiner*—David Dunn
*Assistant Examiner*—Erika Garrett
(74) *Attorney, Agent, or Firm*—Dann, Dorfman, Herrell and Skillman, P.C.

(57) ABSTRACT

An automobile seat in which spaced apart side brackets of a seat back are individually faced to spaced apart side brackets of a seat cushion, a pivot shaft is penetrated through the brackets and bridged between the brackets, and reclining lock devices are assembled on the axis of the pivot shaft to the side brackets, whereby the seat back is held upright such that the angle of the seat back relative to the seat cushion is adjustable and that the seat back is reclinable forward and rearward, and in which the seat back is urged by return spring members to the upright direction. The spring members comprise first and second torsion bar springs that are arranged in proximity to the pivot shaft. The springs are engaged at both end portions thereof with corresponding side brackets in such a manner that the springs cross each other.

4 Claims, 4 Drawing Sheets

AUTOMOBILE SEAT

TECHNICAL FIELD

The present invention relates to an automobile seat and, more particularly, to an automobile seat in which a seat back is pivotally supported on a seat cushion in order that an occupant can cause the seat back to be pivoted rearward relative to the seat cushion, recline the upper half of his/her body against the rearward reclined seat back and then take a comfortable posture.

BACKGROUND ART

Hitherto, as an automobile seat, there has known an automobile seat in which a seat back is pivotally supported on a seat cushion via a pivot shaft so as to be pivotable forward and rearward relative to the seat cushion, and reclining lock devices are mounted on the pivot shaft, whereby the seat back can be maintained in a forward reclined condition, a rearward reclined condition or an upward standing condition relative to the seat cushion and an angle of the seat back relative to the seat cushion can be adjusted. In the automobile seat, when the reclining lock devices are unlocked and the seat back is pivoted rearward relative to the seat cushion, whereby an occupant can recline the upper half of his/her body against the rearward reclined seat back and then take a comfortable posture.

In the automobile seat, return springs for returning the seat back to an upward standing position relative to the seat cushion are employed. More particularly, as the return springs, there are employed spiral springs which are mounted on both ends of the pivot shaft. However, in order to mount the spiral springs, large installation spaces are required. For this reason, in order to obtain a large effective width of the seat back, torsion bar springs are employed in lieu of the spiral springs requiring the large installation spaces.

The torsion bar springs which act as the return spring means are employed in a rear seat which is to be used in a notchback type vehicle in which bulged portions acting as bearing sections for supporting the rear seat are formed on a vehicle body floor and the seat back is supported to the bulged portions by a pivot shaft (Japanese Patent Application Laid-Open Publication No. Hei. 10-157500).

In the rear seat, the torsion bar springs are arranged in the proximity of the seat back so as to extend parallel to the pivot shaft, with one end portions of the torsion bar springs being abutted against a rear surface of the seat back and with the other end portions of the torsion bar springs being abutted against a spare tyre housing section or the like which is provided on a vehicle body floor.

However, in the rear seat, there is a drawback that it is impossible for the torsion bar springs to effectively urge the seat back to an upward standing position relative to a seat cushion.

It is an object of the present invention to provide an automobile seat in which a seat back is pivotally supported on a seat cushion by a pivot shaft acting as a supporting shaft, so as to be pivotable forward and rearward relative to the seat cushion, an angle of the seat back relative to the seat cushion can be adjusted by reclining lock devices, and the seat back can be effectively urged to a vertically standing position by torsion bar springs.

It is another object of the present invention to provide an automobile seat in which torsion bar springs are provided in such a manner that they are not detached from the automobile seat and do not become bars to essential components about the torsion bar springs.

DISCLOSURE OF THE INVENTION

In accordance with the present invention, there is provided an automobile seat which comprises a seat back including first and second side brackets which are spaced apart from each other, a seat cushion including third and fourth side brackets which are spaced apart from each other, a pivot shaft having first and second end portions, the first side bracket and the second side bracket facing the third side bracket and the fourth side bracket, respectively, the first end portion of the pivot shaft penetrating through the first and third side brackets, and the second end portion of the pivot shaft penetrating through the second and fourth side brackets, so that the seat back is pivotally supported on the seat cushion via the pivot shaft so as to be pivotable forward and rearward relative to the seat cushion, first and second reclining lock devices, the first reclining lock device and the second reclining device being mounted on the pivot shaft so as to be interposed between the first side bracket and the third side bracket and between the second bracket and the fourth side bracket, respectively, so that an angle of the seat back relative to the seat cushion can be adjusted by the first and second reclining lock devices, and return spring means for biasing the seat back to a vertically standing position relative to the seat cushion, when the reclining lock devices are unlocked, the return spring means comprising first and second torsion bar springs arranged in the proximity of the pivot shaft, the first torsion bar spring comprising first and second end portions, a first main axial portion, and a sub axial portion for facilitating distortion of the first torsion bar spring, the sub axial portion extending upward from one end of the first main axial portion to the first end portion and bent into a downward facing U-shape, and the first main axial portion linearly extending between the sub axial portion and the second end portions, the second torsion bar spring comprising third and fourth end portions, a second main axial portion, and a sub axial portion for facilitating distortion of the second torsion bar spring, the sub axial portion of the second torsion bar spring extending upward from one end of the second main axial portion to the third end portion and bent into a downward facing U-shape, and the second main axial portion linearly extending between the sub axial portion of the second torsion bar spring and the fourth end portion, and the first torsion bar spring extending between the first side bracket and the fourth side bracket with the first end portion thereof being inserted in the first hanging ring of the first side bracket and with the second end portion thereof hanging on the fourth side bracket, and the second torsion bar spring extending between the second side bracket and the third side bracket with the third end portion thereof being inserted in the second hanging ring of the second side bracket and with the fourth end portion thereof hanging on the third side bracket, whereby the first and second main axial portions cross each other.

In the automobile seat constructed as discussed above, the first and second torsion bar springs are arranged in the proximity of the pivot shaft and bridged between the corresponding side brackets with the main axial portions thereof being crossed with each other, so that distortion forces of the torsion bar springs which are generated by the pivotal movement of the seat back relative to the seat cushion can be stored when the seat back is maintained at the forward or rearward inclined position by the reclining lock devices, and the torsion bar springs can effectively act as the return spring means for the seat back.

The first torsion bar spring may include a sub axial portion for facilitating a distortion of the first torsion bar spring, the sub axial portion being formed by bending a portion between the first main linear axial portion and the first end portion. The second torsion bar spring may include a sub axial portion for facilitating a distortion of the second torsion bar spring, the sub axial portion of the second torsion bar spring being formed by bending a portion between the second main linear axial portion and the third end portion. In this way, the sub axial portion of the first torsion bar spring is formed by bending the portion between the first main liner axial portion and the first end portion, and the sub axial portion of the second torsion bar spring is formed by bending the portion between the second main linear axial portion and the third end portion, whereby a great amount of distortion forces generated by the pivotal movement of the seat back relative to the seat cushion can be stored.

A first region of the first torsion bar spring which extends from the sub axial portion of the first torsion bar spring to the first end portion may be bent in a substantially U-shape. A second region of the second torsion bar spring which extends from the sub axial portion of the second torsion bar spring to the third end portion may be bent in a substantially U-shape. The first side bracket of the seat back may be provided with a first hanging ring. The second side bracket of the seat back may be provided with a second hanging ring. The first substantially U-shaped region is inserted through the first hanging ring and engaged with the first hanging ring. The second substantially U-shaped region is inserted through the second hanging ring and engaged with the second hanging ring. In this case, the first and third end portions and the second and fourth end portions are pulled toward each other, to thereby positively prevent the torsion bar springs from being detached from the side brackets of the seat back frame and seat cushion frame.

The first and second torsion bar springs may be arranged rearward of the pivot shaft. In this case, the torsion bar springs are prevented from being contacted with a padding of the seat back and the like, and do not become bars to the padding and the like.

BEST MODE FOR CARRYING OUT THE INVENTION

An illustrated embodiment according to the present invention is an assistant seat (hereinafter referred to as "an automobile seat") for a right-handle vehicle, in which a seat back is pivotally supported on a seat cushion in such a manner that an angle of the seat back relative to the seat cushion can be adjusted and the seat back is pivotable forward and rearward relative to the seat cushion.

Figure 1:
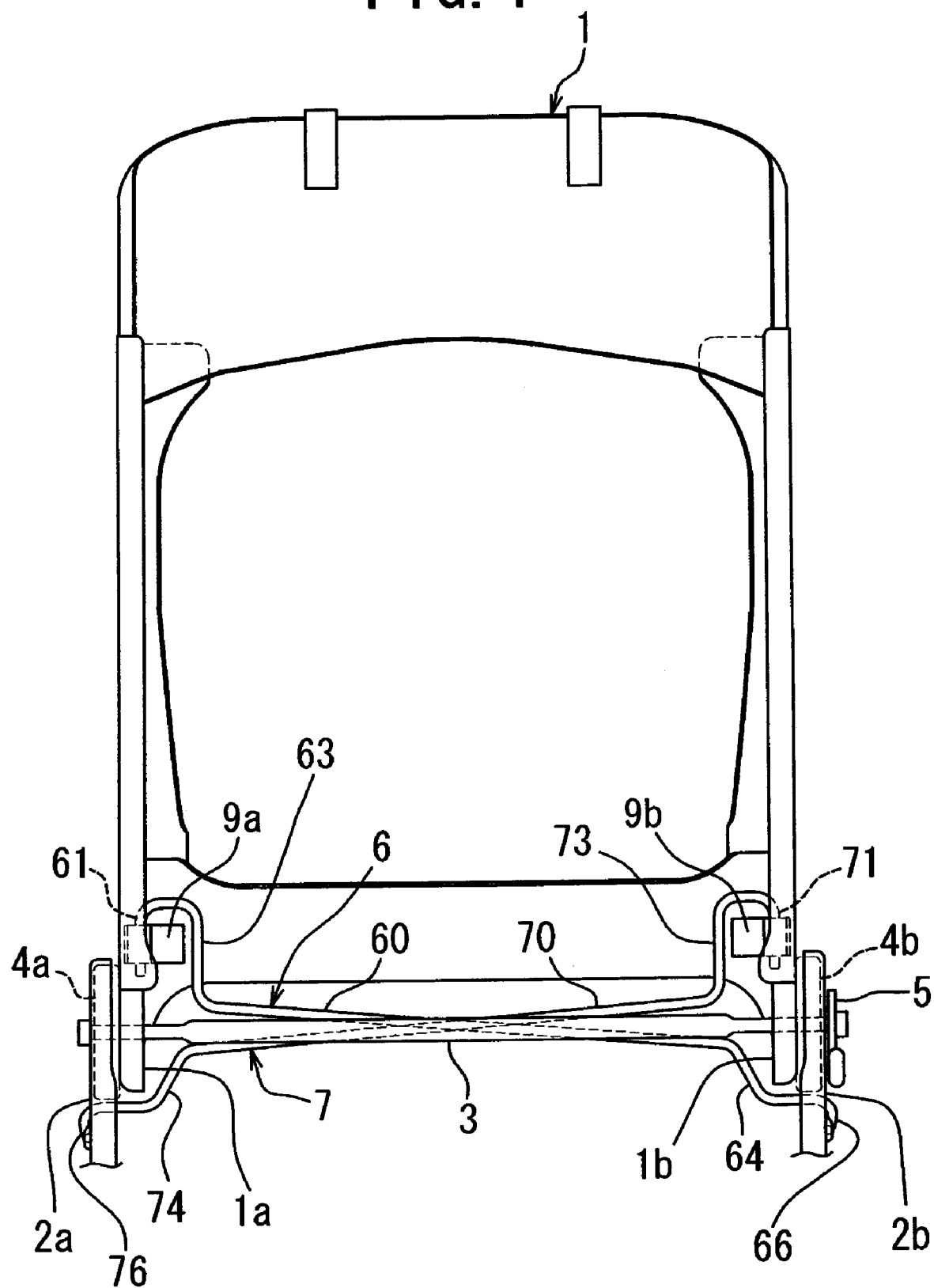
FIG. 1 is a schematic front view of a frame structure for an automobile seat according to the present invention.
Figure 2:
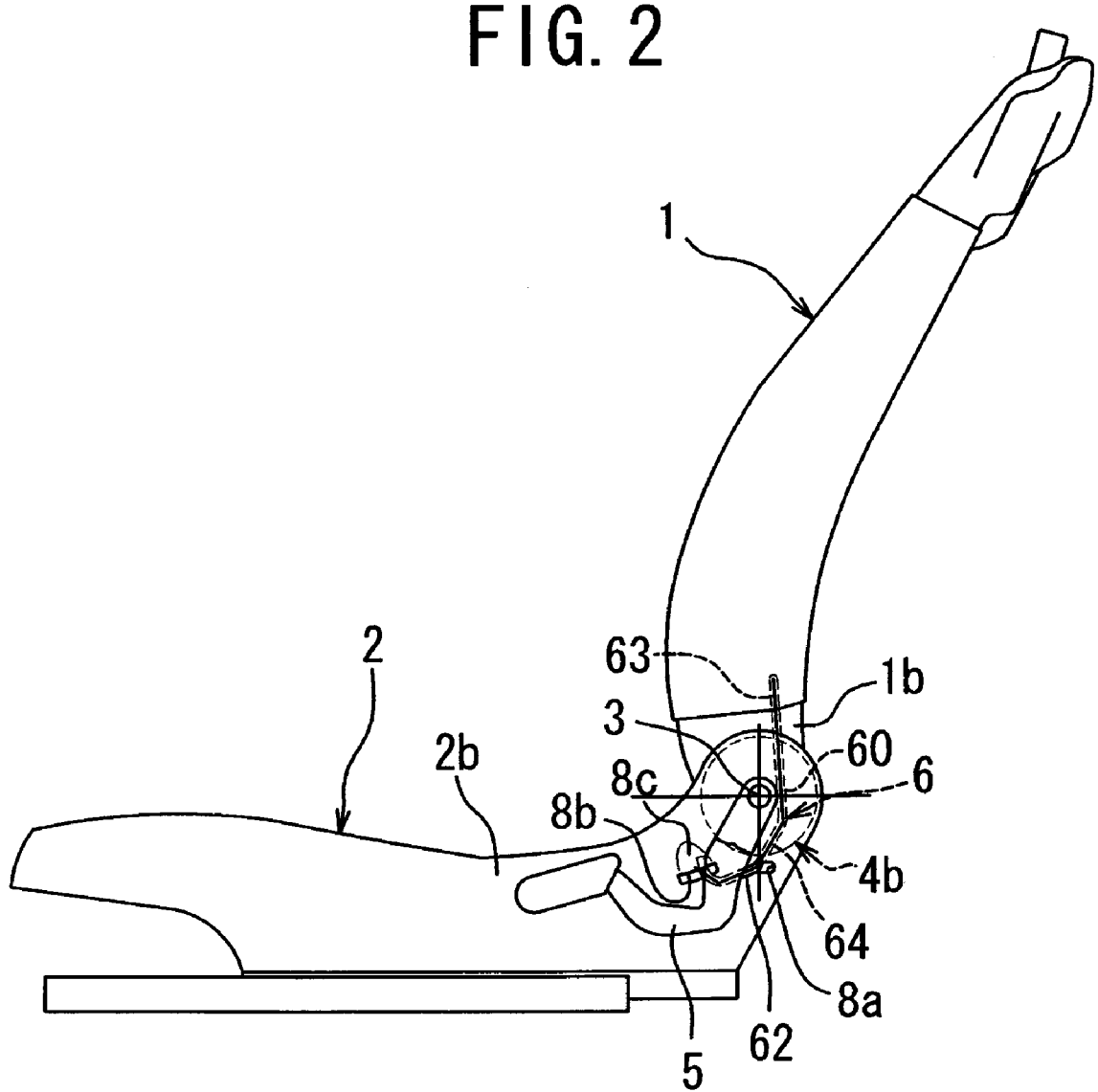
FIG. 2 is a schematic side view of the frame structure of FIG. 1.

Referring to FIGS. 1 and 2, the automobile seat includes a seat back frame 1 for the seat back, the seat back frame 1 having first and second side brackets 1a, 1b which are spaced apart from each other, and a seat cushion frame 2 for the seat cushion, the seat cushion frame 2 having third and fourth side brackets 2a, 2b which are spaced apart from each other. A lower end portion of the first side bracket 1a of the seat back frame 1 and a lower end portion of the second side bracket 1b of the seat back frame 1 face a rear end portion of the third side bracket 2a of the seat cushion frame 2 and a rear end portion of the fourth side bracket 2b of the seat cushion frame 2, respectively. One end portion of a pivot shaft 3 penetrates through the lower end portion of the first side bracket 1a and the rear end portion of the third side bracket 2a. The other end portion of the pivot shaft 3 penetrates through the lower end portion of the second side bracket 1b and the rear end portion of the fourth side bracket 2b. Thus, the pivot shaft 3 is bridged between the first and third side brackets 1a, 2a, and the second and fourth side brackets 1b, 2b. A first reclining lock device 4a is mounted on the pivot shaft 3 so as to be interposed between the first side bracket 1a and the third side bracket 2a. A second reclining lock device 4b is mounted on the pivot shaft 3 so as to be interposed between the second side bracket 1b and the fourth side bracket 2b.

As the first and second reclining lock devices 4a, 4b, there may be employed any suitable conventional reclining lock devices such as ratchet-type reclining lock devices. As shown in FIG. 2, an operating lever 5 is mounted on a left end of the pivot shaft 3. The reclining lock devices 4a, 4b are designed so as to be able to be unlocked by operating the operating lever 5.

The automobile seat further includes first and second torsion bar springs 6, 7 as return spring means which urges the seat back so as to cause the seat back to be returned to a vertically standing position relative to the seat cushion from a forward inclined position or a rearward inclined position relative to the seat cushion. Each of these torsion bar springs 6, 7 is formed by causing a metal bar member, having a diameter of about 7 or 8 mm, to be bent in a predetermined shape which will be discussed in greater detail hereinafter.

Figure 3:
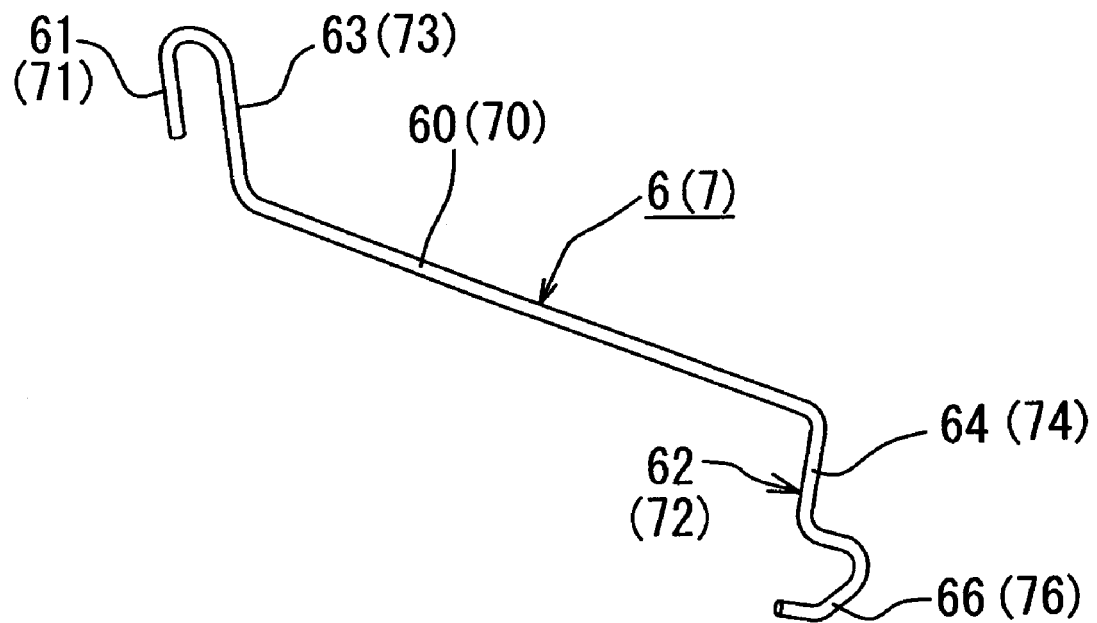
FIG. 3 is a schematic perspective view of a torsion bar spring which is provided at the frame structure of FIG. 1.

Referring to FIG. 3, the first torsion bar spring 6 comprises first and second end portions 61, 62, and a first main axial portion 60 linearly extending between the first and second end portions 61, 62. The first torsion bar spring 6 further includes a first sub axial portion 63 for facilitating the distortion of the first torsion bar spring 6. The first sub axial portion 63 is formed by causing a region of the first torsion bar spring 6, which extends from the first main axial portion 60 to the first end portion 61, to be bent at a substantially right angle relative to the main axial portion 60 in such a manner to upward extend in a downward facing U-shape. The second end portion 62 of the first torsion bar spring 6 comprises a second sub axial portion 64 bent at a substantially right angle relative to the main axial portion 60 and extending downwardly, and a first stopped axial portion 66 extending from the second sub axial portion 64 in such a manner to be curved in a substantially C-shape. Similarly, the second torsion bar spring 7 comprises third and fourth end portions 71, 72, and a second main axial portion 70 linearly extending between the third and fourth end portions 71, 72. The second torsion bar spring 7 further includes a third sub axial portion 73 for facilitating the distortion of the second torsion bar spring 7. The third sub axial portion 73 is formed by causing a region of the second torsion bar spring 7, which extends from the second main axial portion 70 to the third end portion 71, to be bent at a substantially right angle relative to the second main axial portion 70 in such a manner to upward extend in a downward facing U-shape. The fourth end portion 72 of the second torsion bar spring 7 comprises a fourth sub axial portion 74 bent at a substantially right angle relative to the second main axial portion 70 and extending downwardly, and a second stopped axial portion 76 extending from the fourth sub axial portion 74 in such a manner to be curved in a substantially C-shape.

As shown in FIG. 1, the first and second torsion bar springs 6, 7 are arranged in the proximity of the pivot shaft 3 on a rear side of the pivot shaft 3, with the first and second main axial portions 60, 70 thereof being crossed with each other. More particularly, the first torsion bar spring 6 is bridged between the first side bracket 1a of the seat back frame 1 and the fourth side bracket 2b of the seat cushion frame 2 by causing the first end portion 61 to be hanged on the first side bracket 1a of the seat back frame 1 and causing the first stopped axial portion 66 of the second end portion 62 to be hanged on the fourth side bracket 2b of the seat cushion frame 2. Similarly, the second torsion bar spring 7 is bridged between the second side bracket 1b of the seat back frame 1 and the third side bracket 2a of the seat cushion frame 2 by causing the third end portion 71 to be hanged on the second side bracket 1b of the seat back frame 1 and causing the second stopped axial portion 76 of the fourth end portion 72 to be hanged on the third side bracket 2a of the seat cushion frame 2.

The first stopped axial portion 66 of the first torsion bar spring 6 and the second stopped axial portion 76 of the second torsion bar spring 7 are hanged on the fourth side bracket 2b and the third side bracket 2a, respectively, at positions lower than a position in which the pivot shaft 3 horizontally extends. The second and fourth sub axial portions 64, 74 serve to facilitate the distortion of the first and second torsion bar springs 6, 7 in the same manner as the first and second sub axial portions 63, 73 do.

Figure 4:
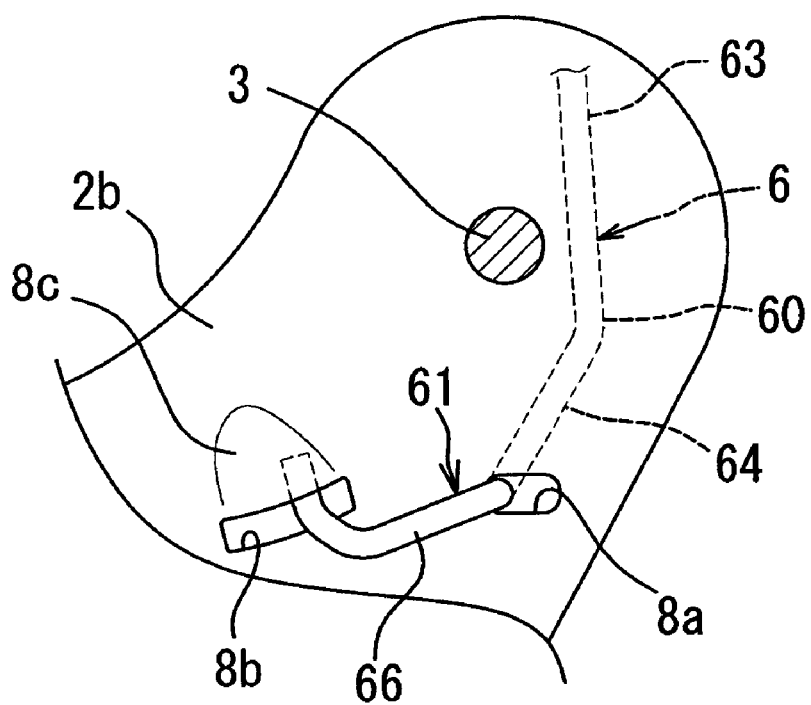
FIG. 4 is a schematic fragmentary enlarged side view of a side bracket of a seat cushion frame, which is of assistance in explaining attaching of one end portion of the torsion bar spring of FIG. 3 to the side bracket.
Figure 5:
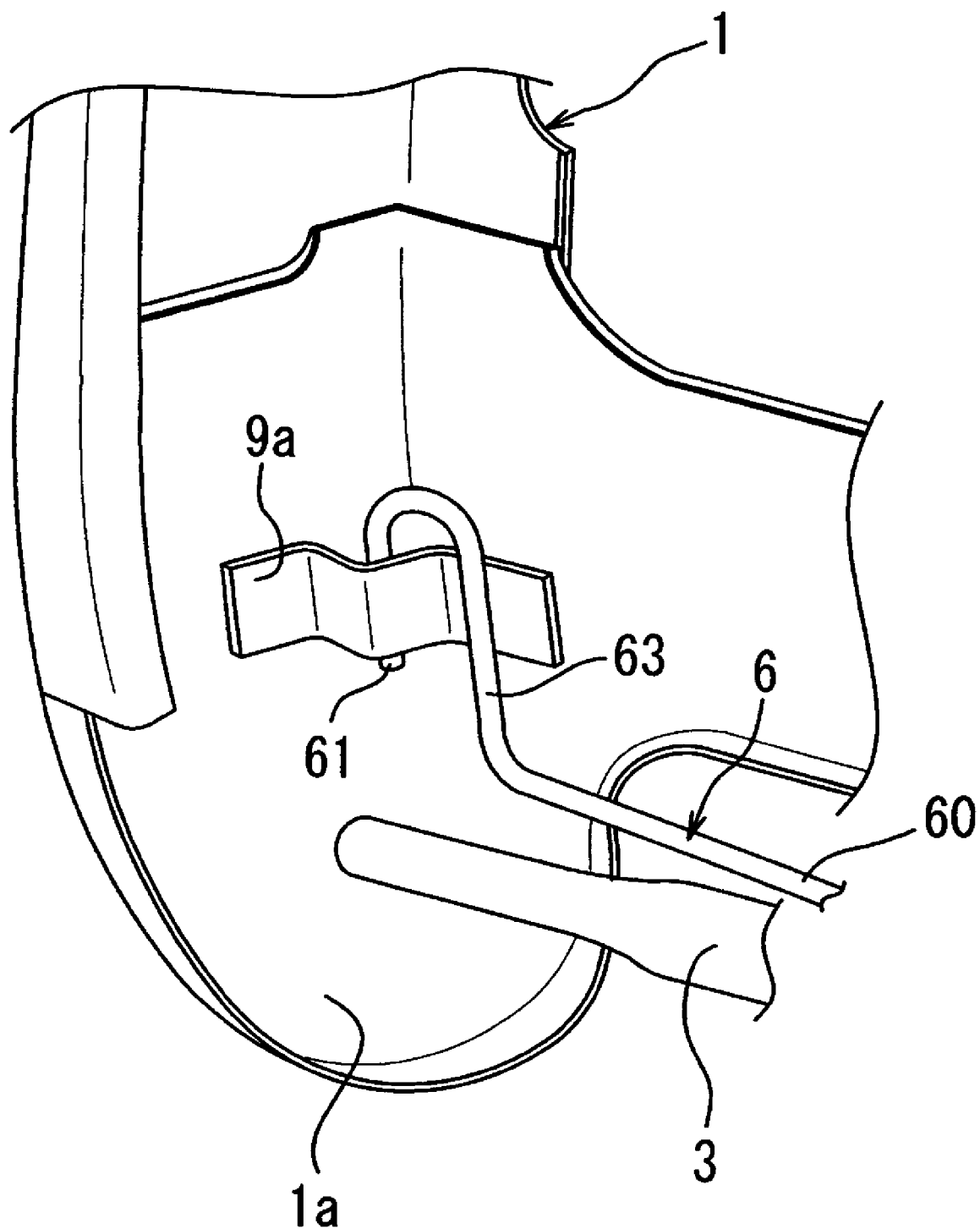
FIG. 5 is a schematic fragmentary enlarged perspective view of a side bracket of a seat back frame, which is of assistance in explaining attaching of the other end portion of the torsion bar spring of FIG. 3 to the side bracket of the seat back frame.

Referring now to FIGS. 4 and 5, a case where the first torsion bar spring 6 is provided between the first side bracket 1a of the seat back frame 1 and the fourth side bracket 2b of the seat cushion frame 2 will be discussed in detail hereinafter. The second torsion bar spring 7 is provided between the second side bracket 1b of the seat back frame 1 and the third side bracket 2a of the seat cushion frame 2 in the same manner as the first torsion bar spring 6 is provided between the first side bracket 1a of the seat back frame 1 and the fourth side bracket 2b of the seat cushion frame 2.

Firstly referring to FIG. 4, a case where the second end portion 62 of the first torsion bar spring 6 is hanged on the fourth side bracket 2b of the seat cushion frame 2 will be discussed hereinafter. The fourth side bracket 2b of the seat cushion frame is formed with an elongated through-hole 8a and an elongated stop hole 8b which are spaced apart from each other. The second end portion 62 of the first torsion bar spring 6 is hanged on the fourth side bracket 2b of the seat cushion frame 2 by causing the first stopped axial portion 66 curved outward from the second sub axial portion 64 of the second end portion 62 of the first torsion bar spring 6 to be inserted through the through-hole 8a of the fourth side bracket 2b, causing a tip end region of the first stopped axial portion 66 to be inserted through the stop hole 8b of the fourth side bracket 2b, and then causing the tip end region of the first stopped axial portion 66 to be engaged with an inner surface of the fourth side bracket 2b. Incidentally, in order that the tip end region of the first stopped axial portion 66 can be tightly engaged with the inner surface of the fourth side bracket 2b, a portion 8c of the fourth side bracket 2b which occupies an upper region of the stop hole 8b may be formed so as to be bulged inwardly of the fourth side bracket 2b.

Next, referring to FIG. 5, a case where the first end portion 61 of the first torsion bar spring 6 is hanged on the first side bracket 1a of the seat back frame 1 will be discussed hereinafter. The first side bracket 1a is provided with a corner portion and a hanging ring 9a attached to the first side bracket 1a. More particularly, the hanging ring 9a is formed of a strip-shaped metal plate of a substantially U-shape and fixed, by welding, to inner surfaces of adjacent walls of the first side bracket 1a which define the corner portion. The first end portion 61 of the first torsion bar spring 6 is supported from the hanging ring 9a by causing the first end portion 61 of the first torsion bar spring 6 to be inserted through the hanging ring 9a so as to be surface-engaged with an inner surface of a front portion of the hanging ring 9a. Incidentally, as shown in FIG. 1, the second side bracket 1b of the seat back frame 1 is also provided with a hanging ring 9b which is fixed to inner surfaces of adjacent walls of the second side bracket 1b by welding, and with an inner surface of a front portion of which the third end portion 71 of the second torsion bar spring 7 is to be surface-engaged by causing the third end portion 71 to be inserted through the hanging ring 9b. Moreover, the third side bracket 2a of the seat cushion frame 2 is also formed with an elongated through-hole (not shown) and an elongated stop hole (not shown) which are spaced apart from each other and act in the same manner as the through-hole 8a and the stop hole 8b of the fourth side bracket 2b of the seat cushion frame 2 do. As described above, since the second torsion bar spring 7 is coupled to the second side bracket 1b of the seat back frame 1 and the third side bracket 2a of the seat cushion frame 2 in the same manner as the first torsion bar spring 6 is coupled to the first side bracket 1a of the seat back frame 1 and the fourth side bracket 2b of the seat cushion frame 2, a description of a process for causing the second torsion bar spring 7 to be coupled to the second side bracket 1b of the seat back frame 1 and the third side bracket 2a of the seat cushion frame 2 is omitted.

According to the above-mentioned structures for causing the torsion bar springs 6, 7 to be coupled to the side brackets, the two torsion bar springs 6, 7 extend on the rear side of the pivot shaft 3 and are arranged in the proximity of the pivot shaft 3 with the main axial portions 60, 70 thereof being crossed with each other (see FIG. 1), so that the torsion bar springs 6, 7 act as the return spring means to cause the seat back to be automatically returned to the vertically standing position from the forward inclined position or the rearward inclined position when the reclining lock devices 4a, 4b are unlocked by operating the operating lever 5.

In the automobile seat constructed as discussed above, the first and second torsion bar springs 6, 7 are arranged in the proximity of the pivot shaft 3 and coupled to the side brackets 1a, 2a, 1b, 2b with the main linear axial portions 60, 70 thereof being crossed with each other, and with the both end portions of the first torsion bar spring 6 and the both end portions of the second torsion bar spring 7 being hanged on the corresponding side brackets of the seat back frame 1 and seat cushion frame 2 and supported to the corresponding side brackets of the seat back frame 1 and seat cushion frame 2, so that distortion forces of the torsion bar springs 6, 7 which are generated by the pivotal movement of the seat back relative to the seat cushion can be stored when the seat back is maintained at the forward or rearward inclined position by the reclining lock devices, and the torsion bar springs 6, 7 can effectively act as the return spring means for the seat back.

In addition to this, the first torsion bar spring 6 includes the first sub axial portion 63 for facilitating the distortion of the first torsion bar spring 6, which is bent at the main axial portion 60 and extends to the first end portion 61, and the second sub axial portion 63 for facilitating the distortion of the first torsion bar spring 6, which is bent at the main axial portion 60 and extends to the first stopped axial portion 66, and the second torsion bar spring 7 includes the sub axial portions 73 for facilitating the distortion of the second torsion bar spring 7, which is bent at the main axial portion 70 and extends to the end portions 71, and the sub axial portions 74 for facilitating the distortion of the second torsion bar spring 7, which is bent at the main axial portion 70 and extends to the second stopped axial portion 76, so that a great amount of distortion forces generated by the pivotal movement of the seat back relative to the seat cushion can be stored.

Moreover, the first end portion 61 of the first torsion bar spring 6 which is bent in a downward facing U-shape from the main axial portion 60 is inserted through the hanging ring 9a from the upper side and engaged with the hanging ring 9a, and the third end portion 71 of the second torsion bar spring 7 which is bent in a downward facing U-shape from the main axial portion 70 is inserted through the hanging ring 9b from the upper side and engaged with the hanging ring 9b, so that the first and third end portions 61, 71 and the stopped axial portions 62, 72 are pulled toward each other, to thereby positively prevent the torsion bar springs 6, 7 from being detached from the side brackets 1a, 2a and the side brackets 1b, 2b.

Moreover, the torsion bar springs 6, 7 are arranged on the rear side of the pivot shaft 3, so that they are prevented from being contacted with a padding of the seat back and the like, and do not become bars to the padding and the like.

The terms and expressions that have been employed are used as terms of description and not of limitation, and there is no intention in the use of such terms and expressions of excluding any equivalents of the features shown and described, or any portions thereof, but it is recognized that various modifications are possible within the scope of the invention claimed.

What is claimed is:

1. An automobile seat comprising:
    a seat back including first and second side brackets which are spaced apart from each other;
    said first side bracket and said second side bracket having a first hanging ring and a second hanging ring, respectively;
    a seat cushion including third and fourth side brackets which are spaced apart from each other;
    a pivot shaft having first and second end portions;
    said first side bracket and said second side bracket facing said third side bracket and said fourth side bracket, respectively, said first end portion of said pivot shaft penetrating through said first and third side brackets, and said second end portion of said pivot shaft penetrating through said second and fourth side brackets, so that said seat back is pivotally supported on said seat cushion via said pivot shaft so as to be pivotable forward and rearward relative to said seat cushion;
    first and second reclining lock devices;
    said first reclining lock device and said second reclining device being mounted on said pivot shaft so as to be interposed between said first side bracket and said third side bracket and between said second bracket and said fourth side bracket, respectively, so that an angle of said seat back relative to said seat cushion can be adjusted by said first and second reclining lock devices; and
    return spring means for biasing said seat back to a vertically standing position relative to said seat cushion, when said reclining lock devices are unlocked;
    said return spring means comprising first and second torsion bar springs arranged in proximity to said pivot shaft;
    said first torsion bar spring comprising first and second end portions, a first main axial portion, and a sub axial portion for facilitating distortion of said first torsion bar spring, said sub axial portion extending upward from one end of said first main axial portion to said first end portion and bent into a downward facing U-shape, and said first main axial portion linearly extending between said sub axial portion and said second end portion;
    said second torsion bar spring comprising third and fourth end portions, a second main axial portion, and a sub axial portion for facilitating distortion of said second torsion bar spring, said sub axial portion of said second torsion bar spring extending upward from one end of said second main axial portion to said third end portion and bent into a downward facing U-shape, and said second main axial portion linearly extending between said sub axial portion of said second torsion bar spring and said fourth end portion; and
    said first torsion bar spring extending between said first side bracket and said fourth side bracket with said first end portion thereof being inserted in said first hanging ring of said first side bracket and with said second end portion thereof hanging on said fourth side bracket, and said second torsion bar spring extending between said second side bracket and said third side bracket with said third end portion thereof being inserted in said second hanging ring of said second side bracket and with said fourth end portion thereof hanging on said third side bracket, whereby said first and second main axial portions cross each other.

2. An automobile seat according to claim 1, wherein said first end portion of said first torsion bar spring is surface-engaged with an inner surface of a front portion of said first hanging ring and said third end portion of said second torsion bar spring is surface-engaged with an inner surface of a front portion of said second hanging ring.

3. An automobile seat according to claim 1 or claim 2, wherein said third side bracket has a first elongated through-hole and a first elongated stop hole, and said fourth side bracket has a second elongated through-hole and a second elongated stop hole, said second end portion of said first torsion bar spring being inserted through said second elongated through-hole and said second elongated stop hole, and said third end portion of said second torsion bar spring being inserted through said first elongated through-hole and said first elongated stop hole.

4. An automobile seat according to claim 3, wherein said third side bracket further has a first inwardly bulged portion occupying an upper region of said first stop hole, and said fourth side bracket has a second inwardly bulged portion occupying an upper region of said second stop hole, a tip of said second end portion of said first torsion bar spring being tightly engaged with said first inwardly bulged portion of said third side bracket, and a tip of said fourth end portion of said second torsion bar spring being tightly engaged with said second inwardly bulged portion of said fourth side bracket.

* * * * *